US005942933A

United States Patent [19]

Yang

[11] Patent Number: 5,942,933
[45] Date of Patent: Aug. 24, 1999

[54] INTERNAL VOLTAGE GENERATION CIRCUIT FOR SEMICONDUCTOR DEVICE

[75] Inventor: Dong Jun Yang, Cheongju, Rep. of Korea

[73] Assignee: LG Semicon Co., Ltd., Cheongju, Rep. of Korea

[21] Appl. No.: 09/045,654

[22] Filed: Mar. 20, 1998

[30] Foreign Application Priority Data

Dec. 27, 1997 [KR] Rep. of Korea .................. 75306/1997

[51] Int. Cl.[6] .................................................. H02J 3/38

[52] U.S. Cl. .......................... 327/530; 327/538; 327/540; 323/313

[58] Field of Search .................................... 327/530, 538, 327/540, 541, 543; 323/313, 316

[56] References Cited

U.S. PATENT DOCUMENTS 5,132,565 7/1992 Kuzumoto ................................ 326/34
5,386,138 1/1995 Wang ........................................ 327/51
5,589,762 12/1996 Iannuzo .................................. 323/351
5,703,475 12/1997 Lee et al. ............................... 323/313
5,771,196 6/1998 Yang ....................................... 365/207
5,786,711 7/1998 Choi ........................................ 326/83

*Primary Examiner*—Timothy P. Callahan
*Assistant Examiner*—An T. Luu
*Attorney, Agent, or Firm*—Fleshner & Kim

[57] ABSTRACT

An internal voltage generation circuit for a semiconductor device includes a voltage generating unit for converting the level of an external voltage in accordance with a reference voltage applied thereto, a driving unit for receiving an output signal of the voltage generating unit and an internal voltage fed back thereto and outputting a predetermined level of the internal voltage, a region detecting unit for detecting a timing point when the external voltage is lowered below the predetermined level thereof, and outputting a signal corresponding thereto, and a switching unit for supplying the external voltage to the internal voltage or interrupting the external voltage in accordance with the output signal of the region detecting unit. The circuit prevents an error operation which may occur in the semiconductor device, when the level of the external voltage is lowered.

16 Claims, 3 Drawing Sheets

INTERNAL VOLTAGE GENERATION CIRCUIT FOR SEMICONDUCTOR DEVICE

BACKGROUND OF THE INVENTION

1. Field of the Invention

The present invention relates to an internal voltage generation circuit for a semiconductor device circuit for converting an external voltage to an internal voltage, and more particularly to an improved internal voltage generation circuit for a semiconductor device which directly supplies the external voltage to the semiconductor device when a level of the external voltage is low.

2. Description of the Background Art

FIG. 1 is a circuit view of a conventional internal voltage generation circuit for a semiconductor device. As shown therein, the conventional internal voltage generation circuit includes a voltage generating unit 1 for converting the level of external voltage Vcc in accordance with reference voltage Vref applied thereto, a driving unit 2 for receiving an output signal of the voltage generating unit 1 and internal voltage Vdd and outputting a predetermined level of the internal voltage Vdd, and an NMOS transistor N11 connected between the driving unit 2 and the ground and for being enabled in accordance with an enable signal Ea.

The voltage generating unit 1 includes an PMOS transistor P11 receiving the reference voltage Vref through its gate, its source connected to the external voltage Vcc, and its drain connected to node Na, and PMOS transistors P12, P13, P14 serially connected between the node Na and the ground, wherein the gate and drain of each of the PMOS transistors P12, P13, P14 are connected to each other.

The driving unit 2 includes a differential amplifier DF with its input terminals connected to the node Na and node Nc serving as an output terminal and a PMOS transistor P15 receiving an output signal of the differential amplifier DF through its gate, its source connected to the external voltage Vcc, and its drain connected to the output terminal Nc.

As shown in FIG. 2, the differential amplifier DF includes: a PMOS transistor P21 with its source connected to the external voltage Vcc and its drain and gate connected to each other; a PMOS transistor P22 which forms an current mirror together with the PMOS transistor P21; an NMOS transistor N21 with its drain connected to that of the PMOS transistor P21 and its gate connected to the node Na of the voltage generating unit 1; an NMOS transistor N22 with its gate connected to the output terminal Nc of the driving unit 2, and its size being identical to that of the NMOS transistor N21; and an NMOS transistor N23 with its drain connected to each source of the NMOS transistors N21, N22.

The operation of the conventional internal voltage generation circuit will now be described.

A reference voltage Vref applied to the gate of the PMOS transistor P11 in the voltage generating unit 1 and a current I flowing through the PMOS transistor P11 is as following equation 1:

$$I=k(V_{GS}-V_T)^2 \quad (1)$$

wherein, $V_{GS}$ is a gate-source voltage of the PMOS transistor P11, $V_T$ is a threshold voltage, and k is a proportional constant.

If the PMOS transistors P12, P13, P14 in the voltage generating unit 1 which are connected with the PMOS transistor P11 in series respectively have the same size as the PMOS transistor P11, the gate-source voltage $V_{GS}$ of the respective PMOS transistors is obtained by an equation 2 as follows:

$$V_{GS}=V_T+\alpha \quad (2)$$

wherein, α is $$\sqrt{\frac{I}{k}}.$$

According to equation 1, a voltage Va at the node Na, the drain of the PMOS transistor P11, is obtained as $3V_{GS}$ by calculation of the voltage $V_{GS}$ times three. Also, in the case in which the external voltage Vcc and the reference voltage Vref are identically increased or decreased, the voltage Va constantly remains at $3V_{GS}$.

The voltage Va is applied to the gate of the NMOS transistor N21 of the differential amplifier DF in FIG. 2, and the internal voltage Vdd is applied to the gate of the NMOS transistor N22 disposed opposite the NMOS transistor N21. The voltage Va and the internal voltage Vdd are compared to each other, whereby the compared value is transmitted to the gate of the PMOS transistor P15 with its source connected to the external voltage Vcc and its drain connected to the output terminal Nc.

Meanwhile, the NMOS transistor N23 commonly connected to the sources of the two NMOS transistors N21, N22 becomes current source in accordance with an enable signal Eb applied to the gate thereof.

Here, the differential amplifier DF, the PMOS transistor P15 and the output terminal Nc form a closed loop, so that the internal voltage Vdd becomes identical to the voltage Va, and the internal voltage Vdd value is obtained by an equation 3 as follows:

$$Vdd=V_{GS}=3(V_T+\alpha) \quad (3).$$

The value of internal voltage Vdd obtained from equation 3 becomes an ultimate internal voltage Vdd in order to be supplied into a semiconductor device (not shown) as an internal voltage.

However, when the level of the external voltage Vcc is lowered, an operation region of the PMOS transistor P11 which receives the reference voltage Vref via the gate thereof is transitted from a saturation region to a linear region.

The PMOS transistor P11 operates in the linear region, so that the voltage Va at the node Na becomes significantly reduced, thereby lowering the level of the internal voltage Vdd.

When the internal voltage being outputted is reduced, the operating speed of the semiconductor device (not shown) being operated by the internal voltage Vdd is disadvantageously decreased as well.

As described above, in the conventional internal voltage circuit for a semiconductor device, a slight lowering of the level of the external voltage Vcc causes the internal voltage Vdd being supplied to the semiconductor device to be abruptly reduced and accordingly the internal voltage Vdd is changed in a large magnitude, whereby the operation of the semiconductor device being operated by the internal voltage is seriously influenced.

SUMMARY OF THE INVENTION

Accordingly, it is an object of the present invention to provide an internal voltage generation circuit for a semiconductor device, capable of preventing an internal voltage from being seriously lowered in level, when the level of an external voltage is lowered.

It is another object of the present invention to provide an internal voltage generation circuit for a semiconductor device, which directly provides the external voltage as an internal voltage, when the level of an external voltage is lowered.

To achieve the above described object, there is provided an internal voltage generation circuit for a semiconductor device according to the present invention which includes a voltage generating unit for converting the level of an external voltage in accordance with a reference voltage applied thereto, a driving unit for receiving an output signal of the voltage generating unit and an internal voltage fed back thereto and outputting a predetermined level of the internal voltage, a region detecting unit for detecting a timing point when the external voltage is lowered below a predetermined level thereof, and outputting a signal corresponding thereto, and a switching unit for supplying the external voltage to the internal voltage or interrupting the external voltage in accordance with the output signal of the region detecting unit.

The objects and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the internal voltage generation circuit for a semiconductor device according to the preferred embodiments of the present invention is described.

Figure 1:
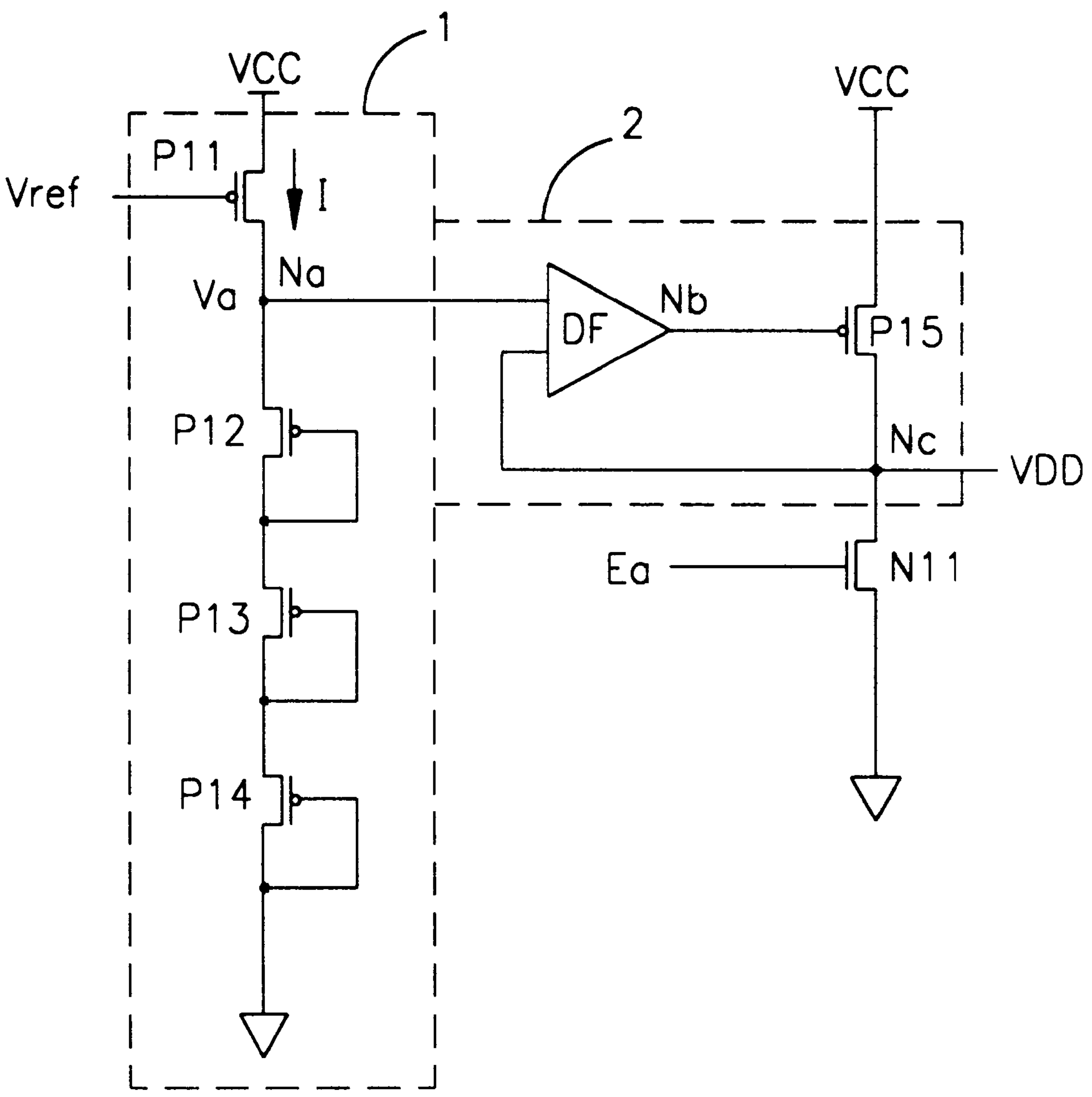
FIG. 1 BACKGROUND ART
FIG. 1 is a circuit view of a conventional internal voltage generation circuit for a semiconductor device.
Figure 2:
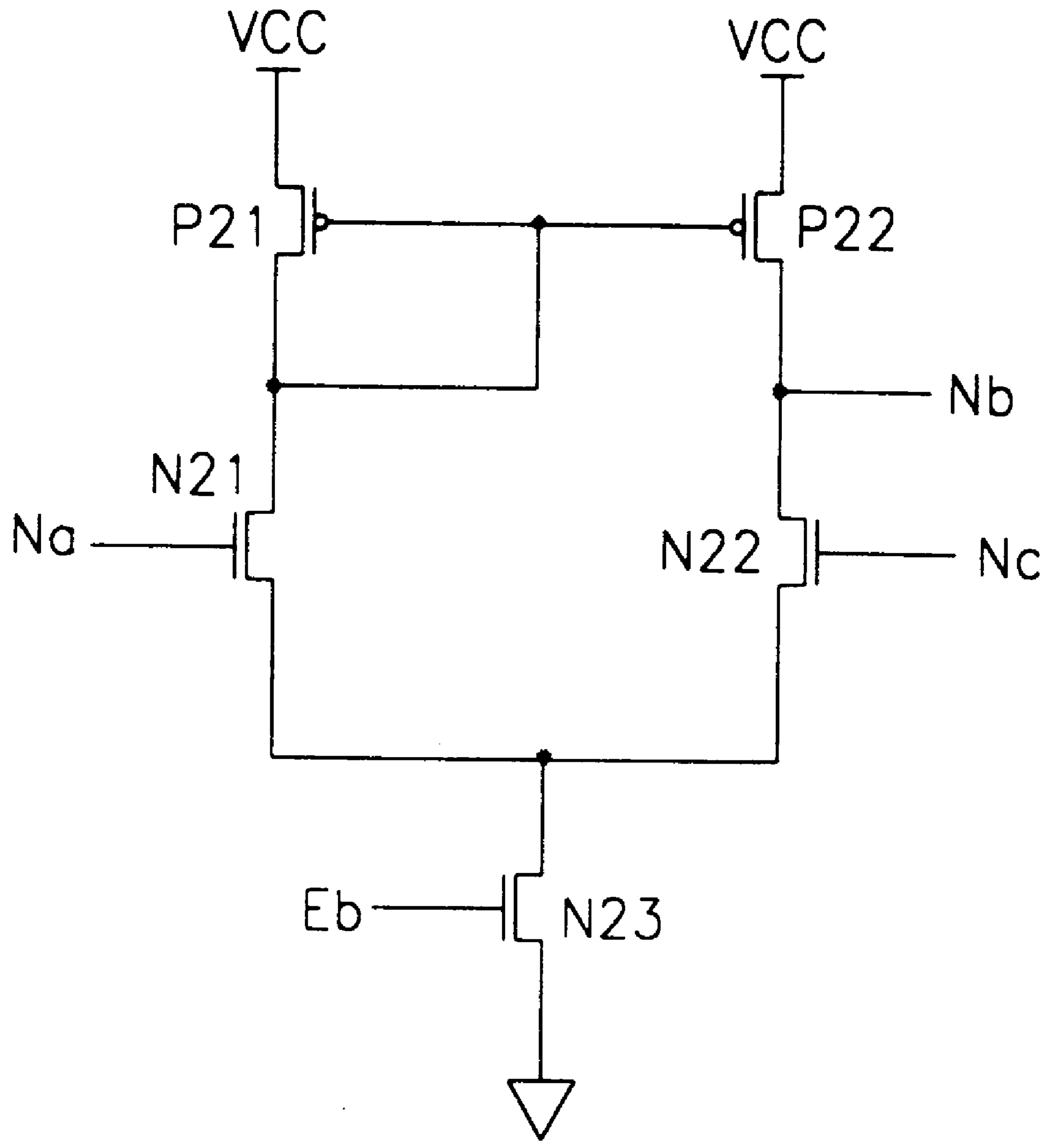
FIG. 2 BACKGROUND ART
FIG. 2 is a circuit view detailing a driving unit in FIG. 1.
Figure 3:
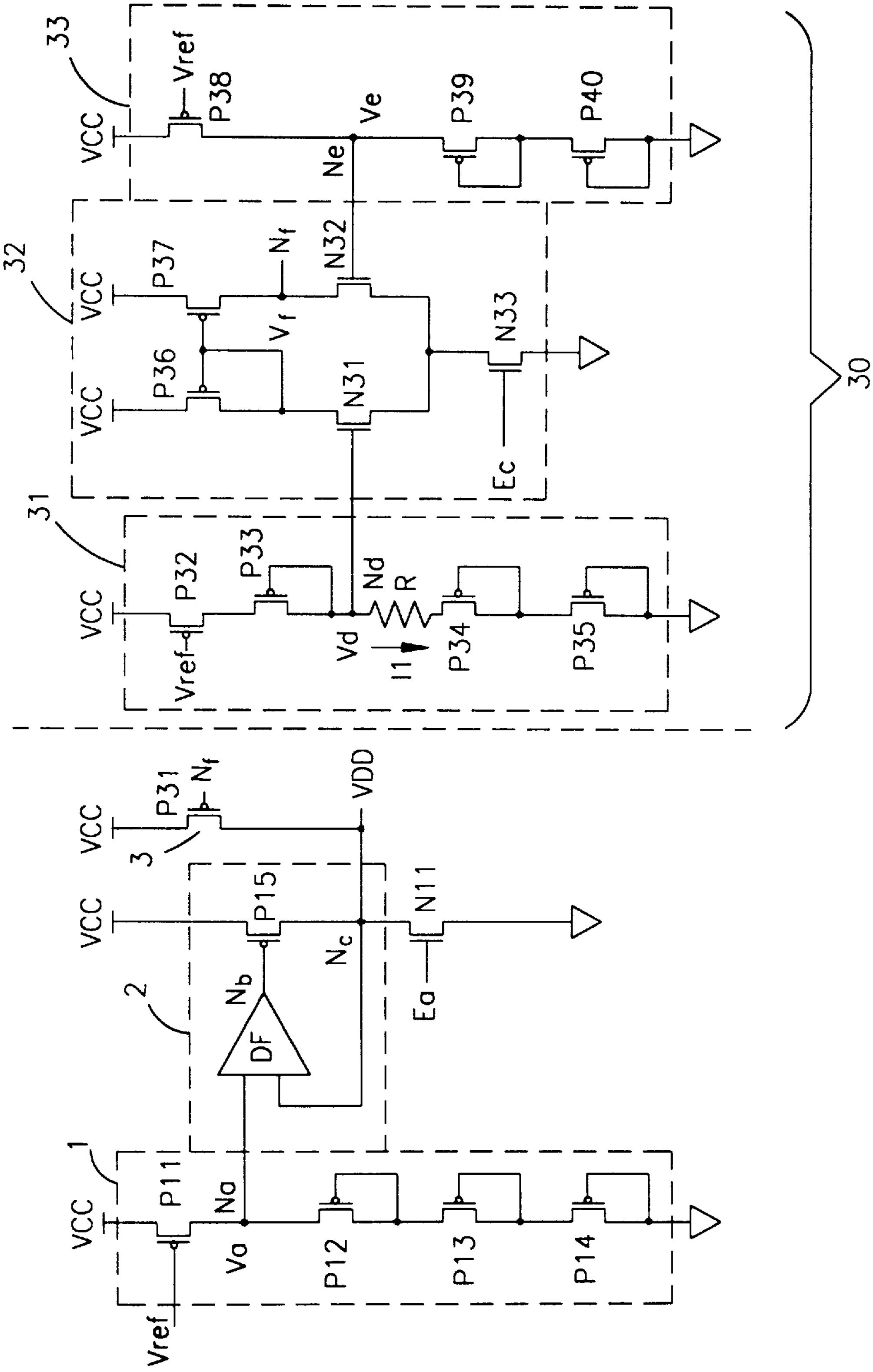
FIG. 3 is a circuit view illustrating an internal voltage generation circuit for a semiconductor device according to preferred embodiments of the present invention.

FIG. 3 is a circuit view illustrating an internal voltage generation circuit for a semiconductor device according to the present invention. As shown therein, in addition to the voltage generating unit 1 serving as a first voltage generator, the driving unit 2 and the NMOS transistor N11 as described in the convention internal voltage generation circuit, the internal voltage generation circuit according to the present invention further includes a region detecting unit 30 and a switching unit 3.

The region detecting unit 30 includes: a second voltage generating unit 31 for converting the level of an external voltage Vcc in accordance with a reference voltage Vref; a third voltage generating unit 33 for converting the level of the external voltage Vcc in accordance with the reference voltage Vref, wherein the level of an output voltage Ve of the third voltage generating unit 33 is lower than that of an output voltage Vd of the second voltage generating unit 31; and a comparator 32 for comparing the output voltage Vd of the second voltage generating unit 31 and the output voltage Ve of the third voltage generating unit 33.

The switching unit 3 includes a PMOS transistor P31 serving as a switching member for converting the external voltage Vcc to the internal voltage Vdd in accordance with an output voltage Vf of the comparator 32 or interrupting the external voltage Vcc.

The second voltage generating unit 31 includes a PMOS transistor P32 with the reference voltage Vref received through its gate, and its source connected to the external voltage Vcc; and three PMOS transistors P33, P34, P35 connected serially between the drain of the PMOS transistor P33 and the ground, wherein the gate and drain of each of the PMOS transistors P33, P34, P35 are connected to each other, wherein a resistance R is connected between the PMOS transistor P33 and the PMOS transistor P34, and wherein node Nd at the drain of the PMOS transistor P33 serves as an output terminal.

The third voltage generating unit 33 includes a PMOS transistor P38 with the reference voltage Vref receiving through its gate, and its source connected to the external voltage Vcc; and a pair of PMOS transistors P39, P40 serially connected between the drain of the PMOS transistor P28 and the ground, wherein the gate and drain of each of the PMOS transistors P39, P40 are connected to each other, and wherein node Ne which links the drain of the PMOS transistor P38 to an exterior serves as an output terminal.

The comparator 32 includes a differential amplifier for comparing the output voltage Vd of the second voltage generating unit 31 which is output at the node Nd with the output voltage Ve of the third voltage generating unit 33 which is output at the node Ne, thereby outputting a low level of output voltage Vf.

The differential amplifier includes a PMOS transistor P36 with its source connected to the external voltage Vcc and its drain and gate connected to each other; a PMOS transistor P37 for forming a current mirror together with the PMOS transistor P36; an NMOS transistor N31 with its drain connected to that of the PMOS transistor P36 and its gate connected to the output terminal Nd of the second voltage generating unit 31; an NMOS transistor N32 with its gate connected to the output terminal Ne of the third voltage generating unit 33 and it is identical to the NMOS transistor N31 in size; and an NMOS transistor N33 with its drain connected to the sources of the two NMOS transistors N31, N32 and it serves as a current source in accordance with the enable signal Ec.

The operation of the internal voltage generation circuit for a semiconductor device according to the present invention will now be explained.

The first voltage generating unit 1 and the driving unit 2 are identical to those of the conventional art in operation and their description will be omitted, accordingly.

With respect to the operation of the region detecting unit 30, the reference voltage Vref is applied to the gate of the PMOS transistor P32 of the second voltage generating unit 31 in the region detecting unit 30 and it is also applied to the gate of the PMOS transistor P38 of the third voltage generating unit 33.

The voltage Vd at the node Nd connected to the drain of the PMOS transistor P33 serially connected to the PMOS transistor P32 satisfies following equation 4 with regard to resistance R and the two PMOS transistors P34, P35 which are serially connected to one another:

$$Vd=2(V_T+\alpha)+I_1R \tag{4},$$

wherein, $I_1$, is a current that flows through the resistance R.

Also, The voltage Ve at the node Ne connected to the drain of the PMOS transistor P38 in the third voltage generating unit 33 satisfies following equation 5 in connection with the two PMOS transistors P39, P40 which are serially connected to the ground:

$$Ve=2(V_T+\alpha) \quad (5).$$

Here, the voltage Vd is applied to the gate of the NMOS transistor N31 in the comparator 32, and the voltage Ve is applied to the gate of the NMOS transistor N32 in the comparator, whereby the two voltages Vd, Ve are compared in level and the compared value is output through the output terminal Nf. When the voltage Vd is higher than the voltage Ve in level, the output voltage Vf from the output terminal Nf is in a high level; when the voltage Vd is lower than the voltage Ve in level, the logic state of the output voltage Vf from the output terminal Nf remains in a low level.

Then, the external voltage level will be explained, when its level is changed.

If the external voltage Vcc is in a high level, the PMOS transistor P32 in the second voltage generating unit 31 and the PMOS transistor P38 in the third voltage generating unit 33 are operated in saturation region, respectively, so that the level of the voltage Vd becomes higher than that of the voltage Ve by a value of $I_1R$. Therefore, the output voltage Vf at the output terminal Nf in the comparator 32 is converted to a high level, whereby the PMOS transistor P31 serving as the switching unit 3 is turned off, and its operation becomes identical to that of the conventional art.

When the level of the external voltage Vcc is lowered or reached to a certain degree of level, the PMOS transistor P32 begins its operation in the linear region, while the PMOS transistor P38 at such a level becomes operating still in the saturation region.

That is, the four PMOS transistors P32~P35 and one resistance R are serially connected between the external voltage Vcc and the ground in the second voltage generating unit 31, and the three PMOS transistors P38~P40 are serially connected between the external voltage Vcc and the ground in the third voltage generating unit 33, so that the PMOS transistor P32 in the second voltage generating unit 31 becomes firstly operated in the linear region, and the voltage Vd at the output terminal Nd of the second voltage generating unit 31 is as follows:

$$Vd=2(V_T+\alpha)+I_1R \quad (6).$$

In such a continual decrease of the level of the external voltage Vcc, when the voltage Vd becomes smaller than the voltage Ve in level as represented in following equation 7, the level of the output voltage Vf at the output terminal Nf in the comparator 32 is converted from high to low.

$$2(V_T+\alpha')+I_1R<2(V_T+\alpha) \quad (7)$$

As the output voltage Vf is turned to a low level, the PMOS transistor P31 serving as the switching unit 3 is turned on. Accordingly, the external voltage Vcc is directly output to the internal voltage Vdd.

As described above, the external voltage generation circuit for a semiconductor device according to the present invention prevents the level of the internal voltage being supplied to the semiconductor device from being lowered by directly converting the lowered external voltage to the internal voltage when the level of the external voltage is lowered. Further, the external voltage generation circuit according to the present invention prevents an error operation which may occur in the semiconductor device, when the level of the external voltage is lowered.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. An external voltage generation circuit for a semiconductor device, comprising:

a first voltage generating unit for converting the level of an external voltage in accordance with a reference voltage applied thereto;

a driving unit for receiving an output signal of the voltage generating unit and an internal voltage fed back thereto and outputting a predetermined level of the internal voltage;

a region detecting unit for detecting a timing point when the external voltage is lowered below a predetermined level thereof, and outputting a first signal; and a switching unit for supplying the external voltage to the internal voltage or interrupting the external voltage in accordance with the first signal of the region detecting unit.

2. The external voltage generation circuit of claim 1, wherein the region detecting unit comprises:

second and third voltage generating units for respectively converting a level of the external voltage in accordance with the reference voltage; and a comparator for comparing respective levels of an output voltage of the second voltage generating unit and another output voltage of the third voltage generating unit.

3. The external voltage generation circuit of claim 2, wherein the level of the output voltage from the second voltage generating unit differs from that of the output voltage from the third voltage generating unit.

4. The external voltage generation circuit of claim 2, wherein the level of the output voltage from the third voltage generating unit is lower than that of the output voltage from the second voltage generating unit.

5. The external voltage generation circuit of claim 2, wherein the second voltage generating unit comprises:

a first PMOS transistor with the reference voltage received through its gate and its source connected to the external voltage;

second to fourth PMOS transistors connected serially between a drain of the second PMOS transistor and a ground voltage, wherein the gate and drain of each of the second to fourth PMOS transistors are connected to each other; and a resistance connected between the second and third PMOS transistors.

6. The external voltage generation circuit of claim 5, wherein the second PMOS transistor includes its drain and gate connected to each other and its source connected to the drain of the first PMOS transistor, the resistance and the output terminal of the second voltage generating unit are connected to the gate of the second PMOS transistor, and the third and fourth PMOS transistors with the gate and drain of each thereof connected to each other are serially disposed between the resistance and the ground.

7. The external voltage generation circuit of claim 2, wherein the third voltage generating unit comprises:

a first PMOS transistor with the reference voltage received through its gate, and its source connected to the external voltage; and second and third PMOS transistors serially connected between a drain of the first PMOS transistor and the ground, wherein a gate and a drain of each of the first and second PMOS transistors are connected to each other.

8. The external voltage generation circuit of claim 7, wherein the drain of the first PMOS transistor is connected to the output terminal of the third voltage generating unit.

9. The external voltage generation circuit of claim 2, wherein the comparator is a differential amplifier.

10. The external voltage generation circuit of claim 2, wherein the comparator comprises:

a first PMOS transistor with its source connected to the external voltage and its drain and gate connected to each other;

a second PMOS transistor for forming a current mirror together with the first PMOS transistor P36;

a first NMOS transistor with its drain connected to that of the first PMOS transistor and its gate connected to the output terminal of the second voltage generating unit;

a second NMOS transistor with its gate connected to the output terminal of the third voltage generating unit and for being identical to the first NMOS transistor in size; and a third NMOS transistor with its drain connected to the respective sources of the first and second NMOS transistors and for serving as a current source thereof in accordance with an enable signal.

11. The external voltage generation circuit of claim 1, wherein the voltage generating unit comprises:

a first PMOS transistor with the reference voltage received through its gate, and its source connected to the external voltage; and second to fourth PMOS transistors serially connected between a drain of the first PMOS transistor and the ground, with a gate and a drain of each thereof connected to each other, wherein the drain of the first PMOS transistor serves as the output terminal of the first voltage generating unit.

12. The external voltage generation circuit of claim 1, wherein the driving unit comprises:

a differential amplifier for receiving an output signal of the first voltage generating unit and a fedback internal voltage; and a fifth PMOS transistor with an output signal of the differential amplifier received through its gate, its source connected to the external voltage, and its drain connected to the fedback internal voltage.

13. The external voltage generation circuit of claim 12, wherein the differential amplifier comprises:

a sixth PMOS transistor with its source connected to an external voltage, and its drain and gate connected to each other;

a seventh PMOS transistor which forms an electrical mirror together with the sixth PMOS transistor;

a first NMOS transistor with its drain connected to that of the sixth PMOS transistor, and its gate connected to the output terminal of the first voltage generating unit;

a second NMOS transistor with its gate connected to the output terminal of the driving unit, and its size being identical to that of the first NMOS transistor; and a third NMOS transistor with its drain connected to the respective sources of the first and second NMOS transistors, and for receiving an enable signal through its gate in order for the third NMOS transistor to serves as a current source.

14. The external voltage generation circuit of claim 12, wherein the switching unit is a PMOS transistor P31 with its source connected to the external voltage, its drain connected to the internal voltage, and its gate connected to the output terminal of the region detecting unit.

15. The external voltage generation circuit of claim 1, wherein the first voltage generation circuit further comprises a switching means connected between the output terminal of the driving unit and the ground and for being enabled in accordance with an enable signal.

16. The external voltage generation circuit of claim 15, wherein the switching means is a NMOS transistor with its drain connected to the output terminal of the driving unit, and its source connected to the ground.

* * * * *